US010929261B1

(12) United States Patent
Levin et al.

(10) Patent No.: US 10,929,261 B1
(45) Date of Patent: Feb. 23, 2021

(54) DEVICE DIAGNOSIS

(71) Applicant: Amazon Technologies, Inc., Seattle, WA (US)

(72) Inventors: Alex Levin, Cupertino, CA (US); Ziv Harel, Kibuz Megido (IL); Evgeny Khanin, Kiryat Bialik (IL); David Ben-Dror, Alon Hagalil (IL); Georgy Machulsky, San Jose, CA (US); Daniel Elkaslassy, Zichron Yaakov (IL); Sergei Shtern, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 16/017,736

(22) Filed: Jun. 25, 2018

(51) Int. Cl.
   *G06F 11/26*  (2006.01)
   *G06Q 30/00*  (2012.01)
   *H04L 29/08*  (2006.01)

(52) U.S. Cl.
   CPC .......... *G06F 11/26* (2013.01); *G06Q 30/016* (2013.01); *H04L 67/141* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 4,868,493 A * | 9/1989 | Becker | ............... | G01R 1/07314 324/73.1 |
| 6,643,798 B2 * | 11/2003 | Barton | ............... | G06F 11/006 714/25 |
| 6,799,179 B2 * | 9/2004 | Tseng | ............... | G06Q 10/087 |
| 9,530,122 B1 * | 12/2016 | Gassaway | ............ | G01R 31/002 |
| 2013/0198346 A1 * | 8/2013 | Jubran | ............... | H04L 41/12 709/220 |
| 2014/0187173 A1 * | 7/2014 | Partee | ............... | H04L 43/045 455/67.12 |
| 2015/0069119 A1 * | 3/2015 | Hastman | ............ | G06Q 10/087 235/385 |
| 2015/0113106 A1 * | 4/2015 | Consul | ............ | H04L 29/12113 709/221 |
| 2015/0254674 A1 * | 9/2015 | Hall | ............... | G06Q 30/012 705/302 |
| 2016/0299768 A1 * | 10/2016 | Consul | ............. | H04L 61/1541 |
| 2019/0019147 A1 * | 1/2019 | McCarty | ............ | G06Q 10/0837 |

* cited by examiner

*Primary Examiner* — Amine Riad

(74) *Attorney, Agent, or Firm* — Thorpe North & Western, LLP.

(57) ABSTRACT

A technology is described for a device diagnosis station. The device diagnosis station may be configured to identify an electronic device physically connected to the device diagnosis station, evaluate an operational state of the electronic device by executing testing instructions configured to test the functionality of the electronic device and collect operational state information for the electronic device. The device diagnosis station may be configured to determine the operational state of the electronic device and execute recovery instructions to restore the electronic device to an improved state when a recoverable error is detected. The device diagnosis station may be configured to initiate a device return procedure for the electronic device when a non-recoverable error state is detected.

21 Claims, 9 Drawing Sheets

DEVICE DIAGNOSIS

BACKGROUND

Electronic devices have become commonplace in almost every environment. As one example, electronic devices found in data centers may include computing devices, network devices, storage devices, and even configurable devices that can be configured, via software, to perform computing, networking, or storage functions. As another example, ordinary consumers may purchase electronic devices for work and pleasure, such as computers, network devices, mobile devices, gaming systems, and the like. One frequent drawback of electronic devices is that an electronic device may fail, causing a user of the electronic device to either attempt to troubleshoot the issue on their own or with the help of a technician over a phone or computer, or the user may return the electronic device to a manufacturer or other entity.

DETAILED DESCRIPTION

Figure 1:
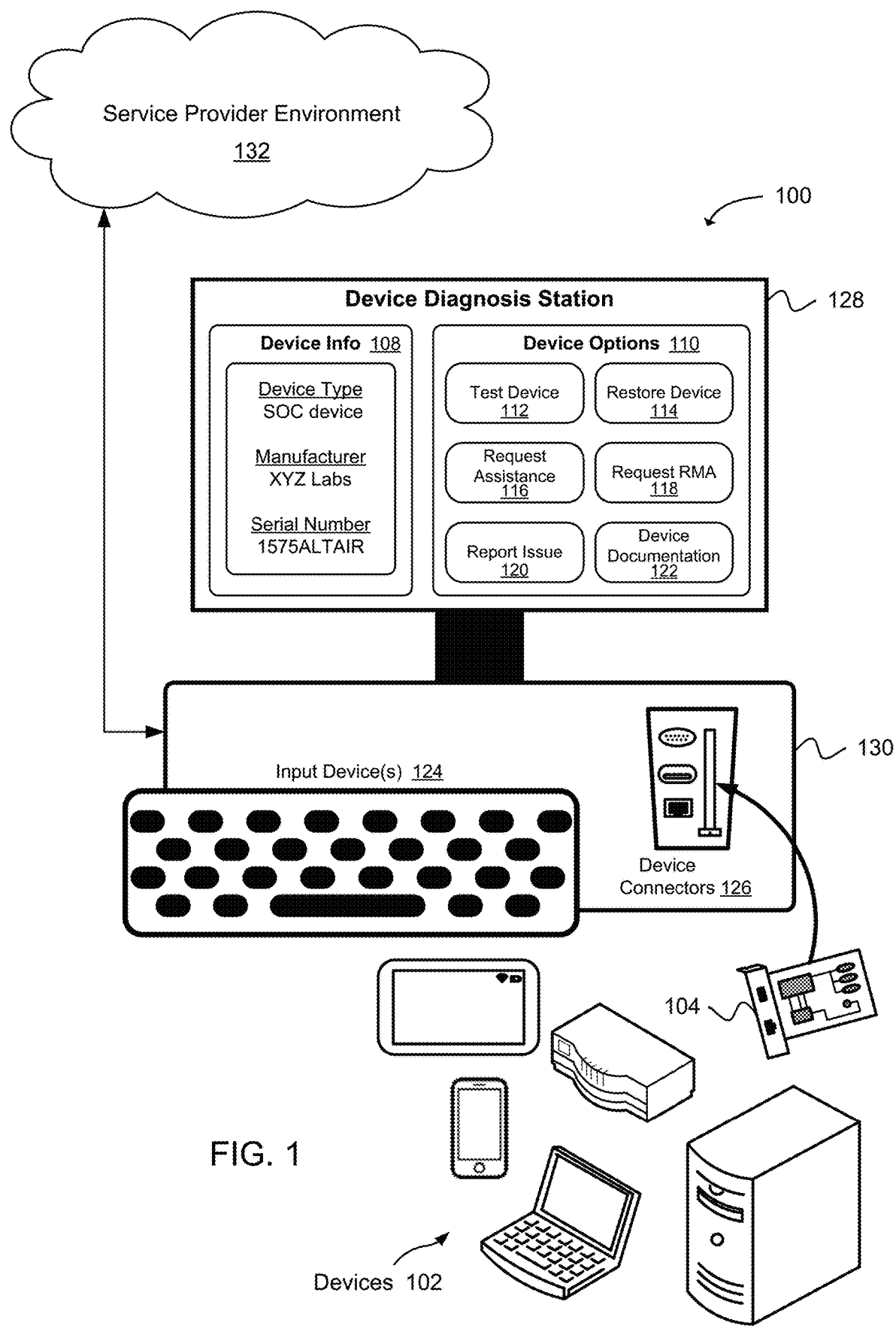
FIG. 1 illustrates an example device diagnosis station that may be configured to provide services related to electronic devices.

Technologies are described for a device diagnosis station and/or operations that may be configured to analyze a functional state of an electronic device communicatively coupled to the device diagnosis station. A determination may also be made regarding whether the electronic device can be restored to a default or functioning state or whether to issue a return merchandise authorization (RMA) for the electronic device when the electronic device cannot be restored to a default state. In one example, a user may connect an electronic device to the device diagnosis station via a compatible hardware interface and the device diagnosis station may identify the electronic device and execute testing instructions (e.g., a testing program or script) to diagnose the functional state of the electronic device. In the case that the device diagnosis station detects that the electronic device is in an error state, the device diagnosis station may be configured to attempt to restore the electronic device to a default state or a functioning state by executing recovery instructions (e.g., a recovery program or script) that installs or reinstalls program code (e.g., firmware, drivers, applications, operating system, etc.) on the electronic device to restore the electronic device to a default state or functioning state. A default state may be the state of a device (e.g., firmware, operating system, applications, etc.) when the device left a manufacturer. Also, a default state or a functioning state may be the state of a device as defined by a user (e.g., a restore point). In the case that an electronic device cannot be restored to a functioning state, the device diagnosis station may be configured to set the electronic device to a default state so that the electronic device can be returned to a manufacturer. In one example, restoring a device to a default state includes removing user data from the electronic device, which may include formatting memory and/or storage included in the device. A RMA may then be issued for the device so that the electronic device can be returned to a manufacturer.

In one aspect, a device diagnosis station may be used in data centers to diagnose malfunctioning or nonfunctioning hardware devices used in data center operations. As an example, data center devices, such as computing hardware, servers, hardware blades, networking hardware, storage hardware, and/or configurable devices (e.g., system on a chip (SOC) devices) may be tested using the diagnosis station to determine functioning states of the hardware devices, and if possible, restore the hardware devices to functioning states and return the hardware devices to service in the data center. In one example, a device diagnosis station may be configured to allow a remote technician to analyze a data center device via a network connection to the device diagnosis station and execute a debugging session. Also, the device diagnosis station may be used to provide documentation and training materials for data center devices to data center workers or administrators, as well as allow workers to report issues that may have occurred with various data center devices.

In another aspect, a device diagnosis station may be provided to non-technical users of an electronic device, who may use the device diagnosis station to troubleshoot functionality issues that occur with the electronic device, and if necessary, obtain a RMA for the electronic device. As an example, a device diagnosis station may be provided as part of a kiosk that is publically accessible to users. A user may bring an electronic device, such as a computer, a computer component, a computing device, mobile device, a printed circuit board, and the like, to the kiosk, connect the electronic device to the device diagnosis station via a device connector that may be compatible with the electronic device, and allow the device diagnosis station to analyze the device to determine a functioning state of the electronic device and attempt to restore the electronic device to a default state or functioning state. In the case that the electronic device cannot be returned to a functioning state, the device may be set to a default state that removes user data from the electronic device, and a RMA may be issued to the user. Also, the device diagnosis station may be used to provide device documentation and training materials to users, as well as allow users to report functionality issues (e.g., software bugs) that may occur with electronic devices.

In the past, diagnosing hardware and software issues associated with electronic devices has been a frustrating process that often calls for a user that has significant technical knowledge to use diagnostic tools to troubleshoot an issue or contact technical support and follow directions provided by a technician. In many cases, a user may simply return an electronic device to a manufacturer in order to avoid troubleshooting an issue with the electronic device. The present technology provides a solution to past problems associated with diagnosing electronic devices by providing a user with a diagnosis station, which the user may use to diagnose an issue with an electronic device and, if possible, resolve the issue with the electronic device, thereby avoiding a return of the electronic device to a manufacturer, distributor, or retailer. Also, in the context of a configurable data center device, such as a SOC device, a diagnostic station may allow a data center worker to repurpose the device by configuring the device to provide the functionality of a defined data center component, such as a computing component, network component, or storage component, rather than discarding the device and ordering additional devices.

To further describe the present technology, examples are now provided with reference to the figures. FIG. 1 illustrates an example device diagnosis station 100 configured to test a device 102 to determine a functional state of the device 102, and whether a device 102 can be returned to a default state when the device 102 is in an error state, as well as other actions associated with devices 102, as described below. A device diagnosis station 100 may comprise a computing device 130 and peripheral devices, which may include one or more input devices 124, output devices 128, and device connectors 126. For example, a device diagnosis station 100 may include a display for presenting device information 108 and device options 110 to users. Also, the device diagnosis station 100 may include a keyboard, touchscreen and/or mouse which may be used to select device options 110 and input information. The device diagnosis station 100 may include a device connector 126 that has a hardware interface used to connect a device 102 to the device diagnosis station 100.

Users, such as data center technicians, ordinary device consumers, retail store workers, and the like, may use a device diagnosis station 100 to determine whether a device 102 is functioning correctly, and in a case where the device 102 is not functioning correctly, attempt to restore the device 102 to a functioning state. A device 102 may include any electronic device, including electronic components that may be included in a device 102. For example, in the context of a data center, a device 102 may include, but is not limited to: processing devices (e.g., SOC devices, graphic cards, motherboards, memory modules, etc.), network devices (e.g., network cards, routers, switches, etc.), and storage devices (hard drives, solid state drives, etc.). In the context of consumer devices, a device 102 may include, but is not limited to: computers (e.g., desktops, laptops, etc.), computer components (motherboards, graphics cards, network cards, memory modules, storage devices, etc.), computer peripherals (displays, input devices, external hard drives, etc.), mobile devices (e.g., tablets, smartphones, audio players, handheld gaming devices, etc.), gaming systems, digital video recorders (DVRs), cameras, Internet of Things (IoT) devices, as well as other electronic devices.

Figure 2:
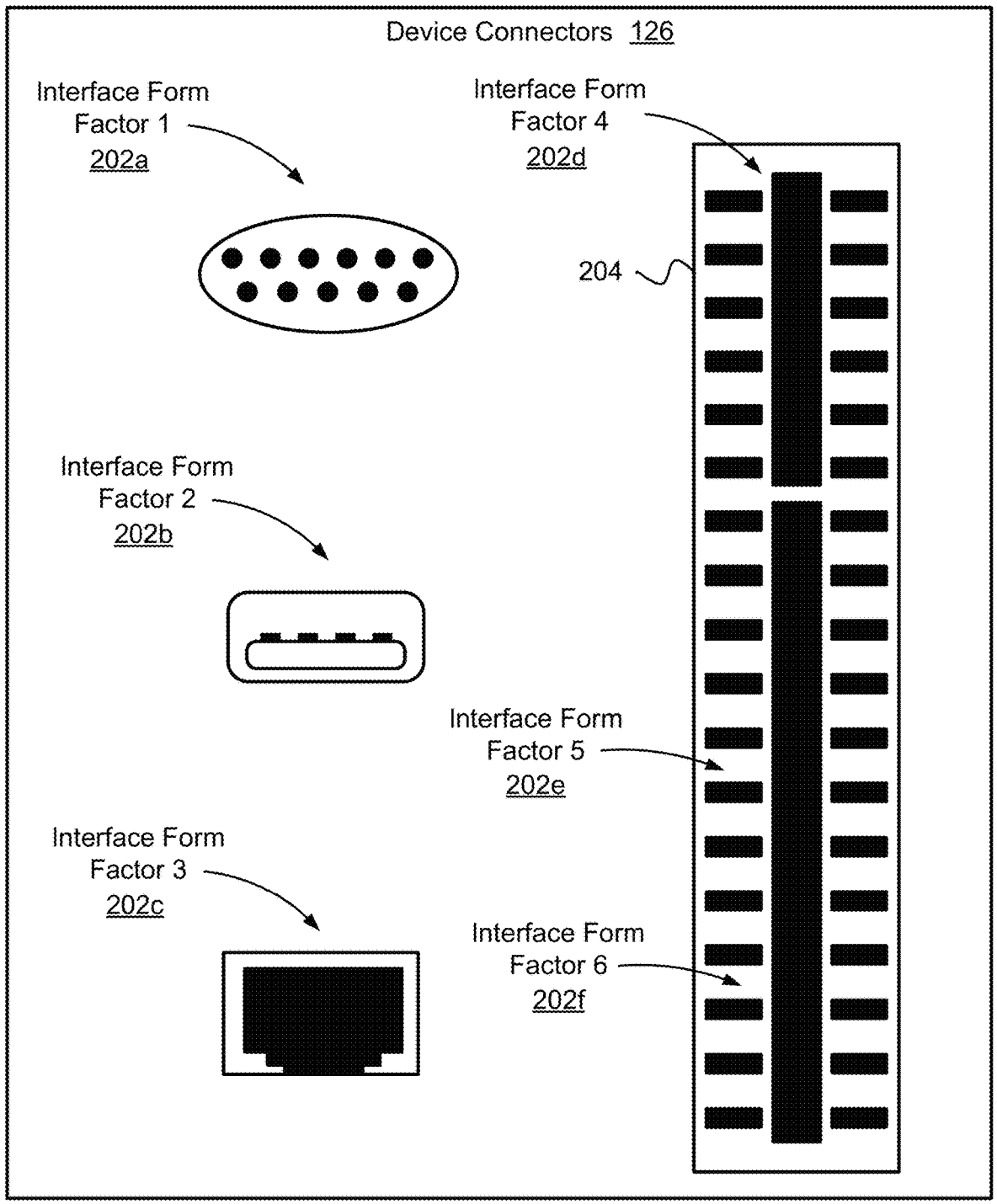
FIG. 2 illustrates an example of a device connector that includes common and specialized hardware interfaces which have a plurality of interface form factors that correspond to hardware interfaces for a plurality of electronic devices.

A user may connect a device 102 to the device diagnosis station 100 by connecting the device's hardware interface (directly to a slot, port, or using an interface cable) to a compatible hardware interface included in the device connector 126. The device connector(s) 126 may include hardware interfaces for a plurality of devices 102. For example, as shown in FIG. 2, the device connector 126 may include common and/or specialized hardware interfaces 202a-f having a plurality of interface form factors that correspond to hardware interfaces for a plurality of devices. The hardware interfaces 202a-f, may include, but are not limited to: parallel interfaces, serial interfaces, universal serial bus (USB) interfaces, peripheral component interconnect (PCI) interfaces, PCI Express interfaces, Mini PCI interfaces, small computer system interfaces (SCSIs), and/or IEEE 1394/Firewire/iLink interfaces. In one example, the device connector(s) 126 may include wireless network components which may be used to connect a wireless device to a device diagnosis station, including WIFI, BLUETOOTH, Zigbee, Z-Wave, NFC (Near Field Communication), cellular, and the like.

Also, the device connector 126 may include one or more adaptable hardware interfaces 204 that have a portion of connectors which may be capable of connecting to a device's hardware interface. For example, as illustrated, an adaptable hardware interface 204 may include multiple interface form factors 202d-f, allowing the adaptable hardware interface 204 to receive a number of different devices having hardware interfaces that correspond to the interface form factors 202d-f included in the adaptable hardware interface 204. As an illustration, an adaptable hardware interface 204 may include a PCI interface, a PCI Express interface, a Mini PCI interface, and/or a specialized PCI interface, allowing a device having any of the above PCI interfaces to be inserted into the adaptable hardware interface 204. A device diagnosis station may be configured to detect which slots of the adaptable hardware interface 204 are occupied, and identify which interface form factor 202d-f is being utilized by a device connected to the adaptable hardware interface 204.

Returning to FIG. 1, after connecting a device 104 to the device diagnosis station 100 via the device connector 126, the device diagnosis station 100 may be configured to detect the device 104 and obtain identifying information for the device 104, which may be used to identify a device profile for the device. For example, the device diagnosis station 100 may be configured to query a device 104 for device information, which may include device type or model, serial number, device manufacturer, as well as other device information, and the device information may be used to retrieve a device profile for the device 104.

In the case that device information cannot be retrieved from a device 104 (e.g., the device 104 is nonresponsive to queries for device information), then other methods may be used to identify the device 104. For example, the device diagnosis station 100 may be configured to detect a hardware interface included in the device connector 126 that is connected to a device 104, and identify devices 102 that include hardware interface designs (e.g., interface form factors) that correspond to the hardware interface. Device descriptions and/or device images associated with the devices 102 may be displayed to a user, and the user may select a device description and/or image that corresponds to the device 104 connected to the device diagnosis station 100. Also, a user may input a device description, via an input device 124, and the device diagnosis station 100 may use the device description to identify a device 104 connected to the device diagnosis station 100. Device information for the device 104 may then be used to retrieve a device profile for the device 104, as described in more detail later in association with FIG. 3.

A user of the device diagnosis station 100 may be presented with device options 110 which may be performed in association with a device 104 connected to the device diagnosis station 100. The device options 110 may be specific to a device 104. For example, device options 110 may be linked to a device profile for a device 104. As such, a device profile may be used to retrieve device options 110 for a device 104. In one example, some device options 110 may be dependent upon other device options 110 being performed first. For example, a device 104 may need to be tested prior to making an option to issue a RMA available to a user. Also, as illustrated, the device diagnosis station 100 may be in network connection with a service provider environment 132. In one example, as described in more detail later, the device diagnosis station may obtain services and data associated with the device options 110 from the service provider environment 132.

In one example configuration, device options 110 for a device 104 may include an option to test the device 112, which executes one or more functionality tests to determine a functioning state of the device 104. For example, the device diagnosis station 100 may be configured to execute functionality tests that include testing instructions (e.g., programs or scripts) configured to test: physical device connections (e.g., power connections, circuit connections, bus connectors, physical network ports, etc.), device or sub-system failures, device software interfaces (e.g., driver interfaces, application programming interfaces (APIs), etc.), and/or instruct a device 104 to perform a defined function which the device 104 may be configured to perform (e.g., boot up, execute computing functions, networking functions, storage functions, etc.). Executing the functionality tests may produce operational state information for the device 104, which may be collected for analysis. Illustratively, the operational state information may include testing results for physical connections, software interfaces, and/or the ability of a device 104 to perform a configured function (e.g., boot up). The device diagnosis station 100 may be configured to analyze the operational state information to determine the operational state of a device 104 and provide the results of the analysis to a user via an output device 128. For example, details regarding device connectivity and device functionality may be provided to a user.

Based in part on the operational state of a device 104, additional device options 110 may be made available to a user. For example, in the case that operational state information shows that a device 104 is unrecoverable, for example, due to a hardware failure, a device option 110 to request a RMA 118 may be made available to a user. Selecting the RMA option 118 may cause a RMA (e.g., an alphanumeric value) to be generated, or cause a request to be sent to a manufacturer, distributor, or retailer for a RMA, and a user may use the RMA to return the unrecoverable device to the device manufacturer, distributor, or retailer. Also, selecting the RMA option 118 may cause a device 104 to be placed in a default state which includes removing user data contained on the device 104. For example, non-volatile memory and/or storage included in a device 104 may be formatted to remove user data. In one example, a device 104 may be formatted to remove both user data and any program code contained on the device 104.

In the case that operational state information shows that a device 104 can be recovered by reinstalling program code (e.g., firmware, executables, drivers, operating system, etc.) on the device 104, a device option 110 to restore the device 114 to an operational state may be made available to a user. In one example, software components may be reinstalled on a device 104. For example, functionality testing performed on the device 104 may identify nonfunctional or faulty software, which may be reinstalled on the device 104. As an example, functionality testing performed using the device diagnosis station 100 may identify faulty firmware on a device 104 and a user may be provided with an option to reinstall firmware on the device 104 that replaces the faulty firmware.

In one example, multiple versions of software (e.g., firmware, drivers, operating systems, software stacks, etc.) may be available to install on a device 104. The device diagnosis station 100 may be configured to provide a user with an option to select a software version to install on a device 104. Also, in the case of a configurable device, such as a SOC device, a user may have the option to configure the device to perform a defined function, such as computing, networking, storage, etc. As an illustration, a SOC device, or a plurality of SOC devices, may be configured to function as a network device, such as a network interface controller (NIC), network router, or network switch. As an example, the device diagnosis station 100 may be configured to identify a selection of software component sets (e.g., software stacks) that are compatible with a configurable device and may be available to install on the configurable device to cause the configurable device to perform a defined function, such as computing, networking, storage, etc. As another example, a user may be presented with a number of real-time operating systems (RTOSs) that may be installed on a configurable device, such as an Internet of Things (IoT) device. The device diagnosis station 100 may be configured to receive a user selection of software and install/reinstall the software on a device 104. Thereafter, the functionality tests performed earlier may be performed again to determine whether installing the software on the device 104 restored the device 104 to an operating state.

Another additional device option 110 that may be made available to a user is a request assistance 116 option that allows a remote technician to remotely inspect a device 104 or take control of the device. Selecting the request assistance option 116 may cause the device diagnosis station 100 to establish a network connection with a technician, who may analyze operational state information that was generated by functionality tests performed on the device 104, as well as execute additional tests on the device 104 to diagnose an operational issue with the device 104. In one example, the device diagnosis station 100 may initiate a session with a virtual technician (e.g., a software agent) configured to interact with a user in order to diagnose an operational issue with a device 104. For example, the virtual technician may interact with a user by asking questions and providing instructions related to a device 104. Operational state information for a device 104 may be provided to the virtual technician, and the virtual technician may be configured to use the operational state information to generate a conversational path or electronic connection (e.g., an electronic conversation, chat, video connection, etc.) used to provide instructions to a user that may be based on user input in order to diagnose an issue with a device 104.

In one example configuration, the device diagnosis station 100 may execute an automated process that performs the functionality tests described above, and based on the outcome of the functionality tests, attempt to restore a device 104 to an operating state or functioning state by reinstalling program code, and then performing the functionality tests again to determine whether the device 104 has been successfully restored to the default state or a functioning state. In the case that restoring the device 104 to the default state or a functioning state is unsuccessful, the automated process may, in one example, establish a network connection with a remote technician who may analyze the device 104, or in another example, issue a RMA to a user.

Also, the device diagnosis station 100 may include device options 110 to report an issue 120 and view device documentation. The report issue 120 option allows a user to report device issues (e.g., hardware and/or software issues) to a manufacturer, distributor, and/or retailer, who may use details submitted by the user to identify and address problems with a device 104. The view device documentation 122 option may provide a user with user manuals, device testing documentation, training videos, and other materials.

The following illustrates an example implementation of the device diagnosis station 100 in a data center for use with SOC devices, which may be configured to perform service provider functions (e.g., "cloud" functions), such as computing, networking, storage, and the like. For example, a SOC device may include processing and memory capabilities used to execute a set of software components (e.g., a software stack) stored on the SOC device, that when executed, causes the SOC device to function as a computing device, networking device, storage device, or another type of device used in a data center. In one example configuration, a SOC device may be coupled to other SOC devices to perform a service provider function. For example, multiple SOC devices may be connected (e.g., via a bifurcated interface) and the SOC devices may work together to function as a computing device, networking device, storage device, or another type of device used in a data center.

The device diagnosis station 100 may be used by data center workers to test, recover, and configure SOC devices with minimal input from the data center workers, as well as to train data center workers on the use of the SOC devices in a data center. The device diagnosis station 100 may be configured to recognize various versions and configurations of SOC devices and obtain relevant tools and software for the SOC devices from a centralized system.

In one example configuration, a data center worker may use the device diagnosis station 100 to recover a SOC device to a factory state. The data center worker may insert the SOC device into a device connector 126 included in the device diagnosis station 100, and the device diagnosis station 100 may be configured to identify the SOC device and execute a recovery process that is specific to the SOC device. For example, the recovery process may execute recovery instructions that reformat the memory of the SOC device to remove installed program code and reinstall factory program code (e.g., firmware and a set of software components) on the SOC device. The recovery process may be automatic, such that minimal input from a data center worker may be needed. In the event that recovery of a SOC device is successful, a notification indicating that the SOC device has been successfully restored to a factory state may be output to an output device 128. In the case that recovery of a SOC device is unsuccessful, a data center worker may be notified via a notification that is output to an output device 128.

Data center workers may use the device diagnosis station 100 to test SOC devices for RMA. The device diagnosis station 100 may execute testing instructions that test SOC device interfaces and connectivity to determine whether the SOC device is eligible for a RMA. That is, a determination may be made whether an issue with the SOC device can be resolved at a data center rather than sending the SOC device back to a manufacturer. For example, a SOC device interface or connectivity issue may indicate a hardware failure which may not be easily fixed at a data center, whereas a software failure may be resolved at the data center by reinstalling the software on the SOC device using the device diagnosis station 100. In one example, the device diagnosis station 100 may be used to provide a remote technician access to a SOC device, via a network connection, allowing the technician to remotely debug the SOC device. For example, a network connection may be established between the device diagnosis station 100 and a remote diagnosis service that allows a technician to use debugging tools to evaluate the functional state of a SOC device.

The device diagnosis station 100 may be used to configure or reconfigure a SOC device to provide a service associated with a data center, such as a computing, networking, storage, etc. For example, a data center worker may connect a SOC device to the device diagnosis station 100 and the device diagnosis station 100 may be configured to identify the SOC device (e.g., the device type, model, version, manufacturer, etc.) and present the data center worker with a listing of data center configurations that are available for the SOC device. The data center worker can select a specific data center configuration for the SOC device and a set of software components associated with the selected data center configuration may be installed on the SOC device. After configuring the SOC device, the data center worker may install the SOC device in the data center (e.g., in a server) to provide a data center service according to the data center configuration of the SOC device.

Figure 3:
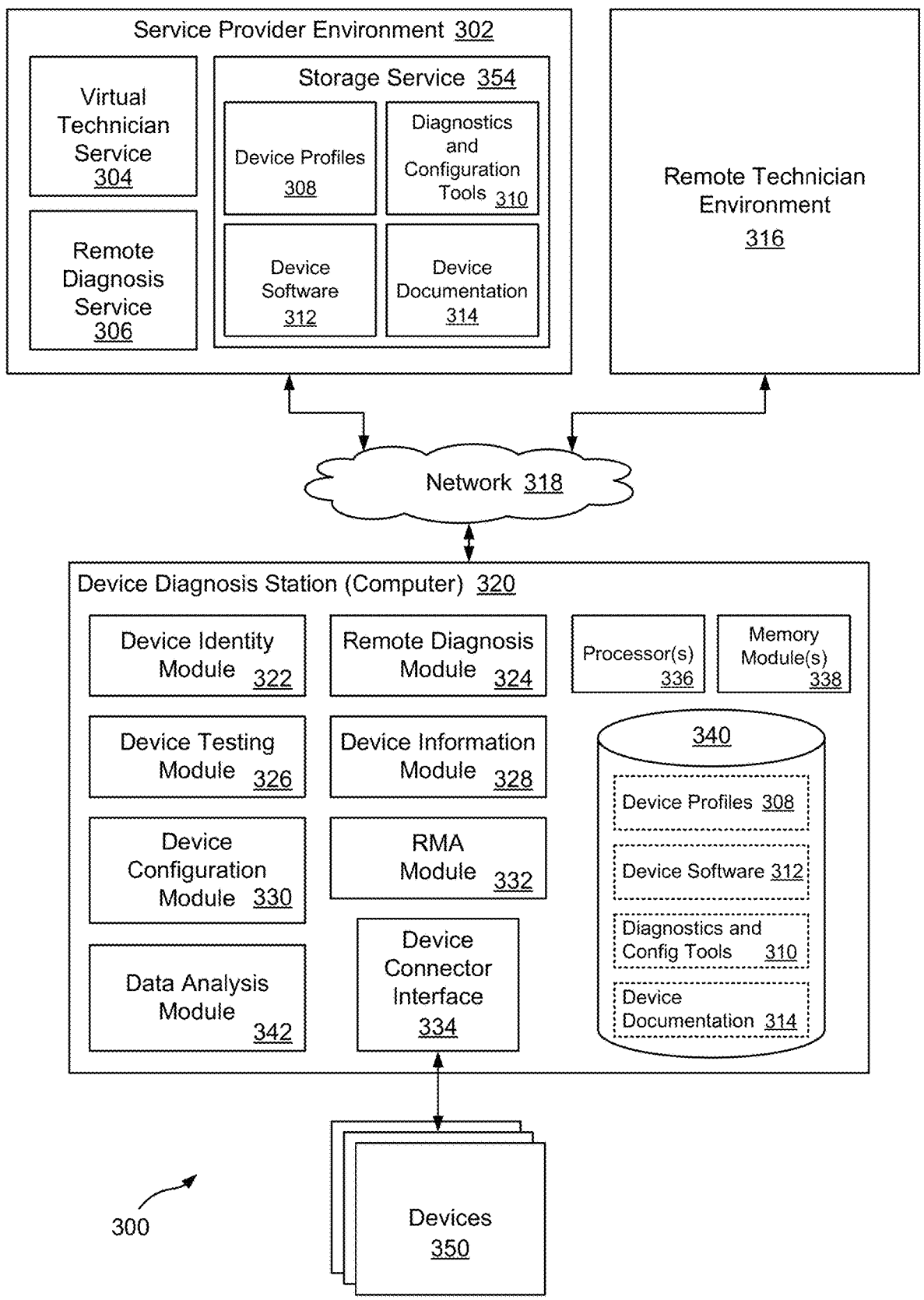
FIG. 3 is a block diagram that illustrates various example components included in a system environment that includes a device diagnosis station.

FIG. 3 illustrates components of an example system environment 300 on which the present technology may be executed. The system environment 300 may include a device diagnosis station 320 with a computing device, which may be configured to provide the services described above in association with FIG. 1. The system environment 300 may also include a service provider environment 302 (e.g., a "cloud" environment) which may be in network communication with the device diagnosis station 320 and may provide services, tools, and/or information associated with testing, restoring, and configuring devices 350. The system environment 300 may also include a remote technician environment 316 with which a network channel may be established to allow a remote technician to access a device 350 in order to analyze the device 350. In one example, the remote technician environment 316 may include one or more workstations which may be used by technicians to inspect a device 350 and/or take control of a device 350. In another example, the remote technician environment 316 may include a computing service environment containing servers and virtualized resources, such as computing instances, used by a technician to inspect and/or take control of a device 350 via a network connection. In some examples, device data may be obtained from a device 350 and the device data may be sent to the remote technician environment 316 to allow a technician to analyze the device data and diagnose an issue with the device 350. Device data may include, but is not limited to, device memory content, device storage content, device system information, user data, as well as other data. As a non-limiting example, the remote diagnosis module 324 may be configured to perform a memory dump on device memory (e.g., random access memory (RAM)) to obtain the content of the device memory, as well as obtain other device data (e.g., system data) from non-volatile storage devices, and send the device data to the remote technician environment 316, allowing a technician to diagnose, identify and/or resolve a problem that led to a device failure (e.g., software and/or hardware failure).

In the example illustrated, the device diagnosis station 320 may include a device identity module 322, device testing module 326, device configuration module 330, remote diagnosis module 324, device information module 328, data analysis module 342, and RMA module 332. Also, the device diagnosis station 320 may include a device connector interface used to physically or wirelessly connect a device 350 to the device diagnosis station 320. The device identity module 322 may be configured to detect a device 350 connected to a device connector interface 334 and identify the device 350 or device type using, if available, identity information (e.g., device type or model, serial number, device manufacturer, etc.) obtained from the device 350. For example, the device identity module 322 may be configured to query a device 350 for device information and use the device information to obtain a device profile 308 for the device. As an example, the device identity module 322 may use a device type and model obtained from a device 350 to retrieve a device profile 308 that corresponds to the device type and model. In the case that identity information cannot be obtained from a device 350 (e.g., the device 350 is inoperative), the device identity module 322 may be configured to identify a hardware interface used to connect the device 350 to the device connector interface 334, and provide a user with a listing of devices (e.g., device images and/or descriptions) that correspond with the hardware interface. The user may select the device 350 from the listing of devices, and a device profile 308 may be retrieved for the device 350.

In one example, a device profile 308 may include device hardware information and software information for a device 350. The hardware information may include, but is not limited to: device type or model, serial number, device manufacturer, hardware interface(s), processing components, memory components, networking components, storage components, graphics components, as well as other hardware information. The software information may include, but is not limited to: operating system information, firmware identity, driver identity, applications loaded, software or solution stack(s), as well as other software information. Also, a device profile 308 may include testing instructions used to determine a functional state of a device 350, and recovery instructions used to recover a device 350 to a default or base state. Alternatively, a device profile 308 may include a link to the testing and recovery instructions, which may be stored in a storage service 354 hosted in a service provider environment 302, or stored in a data store 340 on the device diagnosis station 320. The information included in a device profile 308 may be used by the various modules included in the device diagnosis station 320, as described below.

In one example, the device identity module 322 may be configured to retrieve a device profile 308 from a storage service 354 hosted in a service provider environment 302. In another example, the device identity module 322 may be configured to retrieve a device profile 308 from a data store 340 located on the device diagnosis station 320. The device profile 308 may be made available to other modules on the device diagnosis station 320 that are configured to use the information included in the device profile 308.

The device testing module 326 may be configured to execute one or more tests on a device 350 connected to the device diagnosis station 320 to determine an operating state of the device 350. In one example, the device testing module 326 may obtain testing instructions for a device 350 from a device profile 308, or from a location specified in the device profile 308, and execute the testing instructions. In one example, the testing instructions may include diagnostics tools 310, such as scripts or applications that, when executed, test a device's hardware and software to determine an operational state of the device 350. Results of tests executed on a device 350 may be available to other modules included in the device diagnosis station 320, which may be configured to use the results. Also, results of the tests may be output to a user, who may analyze the results and take further action based in part on the results, such as ask the device diagnosis station 320 to recover a device 350 to a functioning state (e.g., a default state or base state), or request a RMA.

The data analysis module 342 may be configured to analyze device data obtained from a device 350 to identify an issue with the device 350. For example, device data may be obtained by performing a memory dump on device memory (e.g., RAM or FlashRAM) to obtain the content of the device memory, as well as obtain other device data (e.g., system data) from non-volatile storage devices. The device data may be provided to the data analysis module 342, which may be configured to programmatically analyze the device data in order to diagnose, identify and/or resolve a problem that led to a device failure (e.g., software and/or hardware failure).

In one example, the data analysis module 342 may use a machine learning model to analyze device data. The machine learning model may be trained using device data used to diagnose a plurality of devices, and the machine learning model may be deployed to the device diagnosis station 320 for use in diagnosing devices 350. In one example, the data analysis module 342 may be periodically updated, over a network 318, to include updated analysis data. For example, a machine learning model used by the data analysis module 342 may be retrained using updated device data and the updated machine learning model may be deployed to the device diagnosis station 320.

The device configuration module 330 may be configured to install or reinstall software on a device 350 in order to attempt to restore the device 350 to a functioning state (e.g., a default or base state), or install a specialized configuration on the device 350 (e.g., install a data center configuration on a SOC device). In one example, the device configuration module 330 may use device information obtained from a device profile 308 to identify recovery instructions for restoring a device 350 to a functioning state. The recovery instructions may include configuration tools (e.g., scripts and/or applications) that, when executed, format or reformat a device 350 and install device software 312 on the device 350. The recovery instructions may also reset device settings and remove user data. As illustrated, the diagnostics and configuration tools 310 and/or the device software 312 may be obtained from a storage service 354 hosted in a service provider environment 302, or obtained from a data store 340 located on the device diagnosis station 320. In one example, recovery instructions for a device 350 may reformat a device's memory module 338 or other storage to delete a corrupted instance of firmware and reinstall an instance of the firmware on the memory module 338. In another example, the device configuration module 330 may use device information obtained from a device profile 308 to identify one or more software stacks that are available to install on a device 350, such as a SOC device, and install a user selected software stack on the device 350.

The remote diagnosis module 324 may be configured to establish a network connection with a remote technician in order to obtain device testing and analysis beyond what the device testing module 326 is able to provide. In one example, the remote diagnosis module 324 may establish a network connection between the device diagnosis station 320 and a remote technician environment 316. A technician, via a computer located in the remote technician environment 316, may be provided with access to a device 350 connected to the device diagnosis station 320, allowing the technician to run diagnostic tests on the device 350, view device output, inspect device logs, as well as perform other actions associated with diagnosing problems experienced with a device 350. A remote technician may implement recovery actions to attempt to restore a device 350 to a functioning state (e.g., a default or base state), and may cause a RMA to be issued when a determination is made that the device 350 is unrecoverable.

In another example, the remote diagnosis module 324 may establish a network connection with a virtual technician service 304 hosted in a service provider environment 302. The virtual technician service 304 may provide a virtual technician (e.g., a chatbot, software agent, artificial intelligence (AI) or virtual assistant, etc.) to users of the device diagnosis station 320. The virtual technician may be configured to interact with a user in order to diagnose an operational issue with a device 350. For example, the virtual technician may interact with a user by asking questions and providing instructions related to a device 350. Operational state information for the device 350 may be provided to the virtual technician service 304, and the virtual technician service 304 may be configured to use the operational state information to generate a conversational path used to interact with the user. The virtual technician service 304 may propose actions based on operational state information for a device 350 and input provided by a user, and cause a proposed action approved by a user to be implemented.

The device information module 328 may be configured to identify device documentation 314 for a device 350 and provide the device documentation 314 to a user of the device diagnosis station 320. The device documentation 314 may include user manuals, device testing documentation, training videos, and other materials related to a device 350. As an example, the device information module 328 may use device information obtained from a device profile 308 to identify device documentation 314 associated with a device 350 and provide the device documentation 314 to a user via an output device, such as a display.

The RMA module 332 may issue a RMA number or value when testing results indicate that a device 350 may be unrecoverable. In one example, testing a device 350 may be a prerequisite to issuing a RMA. Accordingly, testing results generated by the device testing module 326 may be available to the RMA module 332, and if the testing results indicate that a device 350 may be unrecoverable, the RMA module 332 may obtain a RMA from a manufacturer, distributor, or retailer and issue the RMA to a user of the device diagnosis station 320. Also, along with issuing a RMA, the RMA module 332 may cause user data to be removed from a device 350. For example, non-volatile memory and/or other storage device may be formatted to remove user data, thereby preventing the user data from being exposed to entities that may come in contact with the device 350 later. In one example, the RMA module 332 may also cause computer code (e.g., firmware, executables, drivers, operating system, etc.) to be removed from a device 350 in association with issuing a RMA.

In one example, the service provider environment 302 may host a remote diagnosis service 306 configured to provide the services, or a portion of the services described above in association with the modules 322/324/326/328/330/332. The device diagnosis station 320 may be configured to provide a user with an interface to the remote diagnosis service 306 allowing a user to interact with the remote diagnosis service 306 over a network 318. For example, a user may connect a device 350 to the device diagnosis station, via a device connector interface 334, and the remote diagnosis service 306 may be configured to identify the device 350 using identifying information sent from the device diagnosis station 320 to the remote diagnosis service 306. The remote diagnosis service 306 may execute tests on the device 350 using diagnostics tools 310 remotely executed over the network 318. Also, the remote diagnosis service 306 may be configured to execute configuration tools 310 to attempt to restore a device 350 to a functioning state, and/or configure a device 350 for use in a data center. In the case that a device 350 may be unrecoverable, the remote diagnosis service 306 may be configured to remove user data from the device 350 and issue a RMA for the device 350. The service provider environment 302 may include computing resources for executing computing instances (e.g., virtual machines), which may be an instance of a software implementation of a machine (i.e. a computer) configured to emulate a physical machine. The remote diagnosis service 306, the virtual technician service 304, and/or the storage service 354 may be hosted on one or more computing instances.

The various processes and/or other functionality contained within the system environment 300 may be executed on one or more processors 336 that are in communication with one or more memory modules 338. FIG. 3 illustrates that the device profiles 308, device software 312, diagnostics and configuration tools 310, and device documentation 314 may be stored using the storage service 354 hosted in the service provider environment 302, or may be stored in a data store 340 located on the device diagnosis station 320. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the computing service environment 300 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 318 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. While FIG. 3 illustrates an example of a system that may implement the techniques above, many other similar or different environments are possible. The example environments discussed and illustrated above are merely representative and not limiting.

Figure 4:
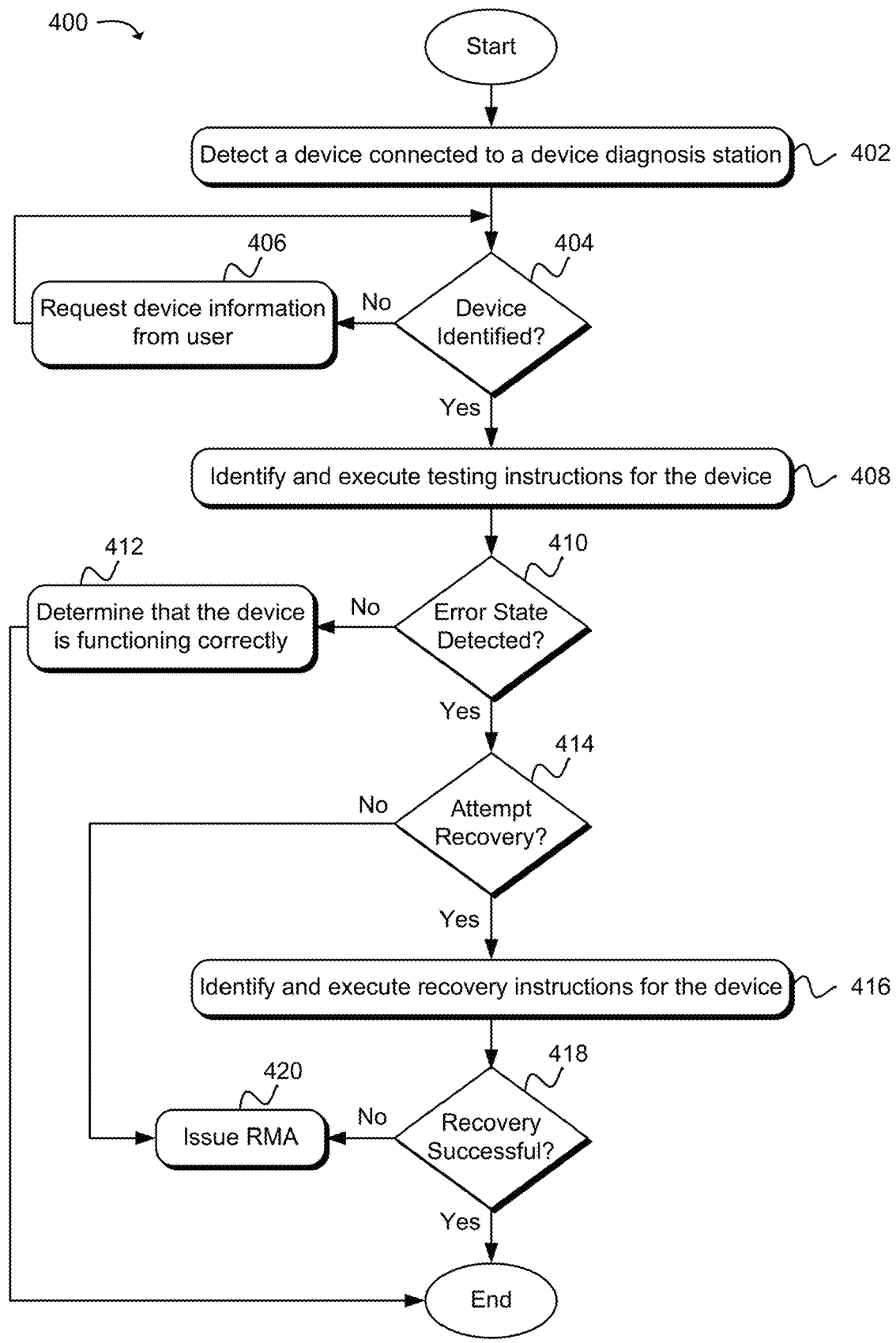
FIG. 4 is a flow diagram illustrating an example method for analyzing a functional state of a device that is communicatively coupled to a device diagnosis station.

FIG. 4 is a flow diagram that illustrates an example method 400 for analyzing a functional state of a device that is communicatively coupled to a device diagnosis station. Starting in block 402, the device diagnosis station may be configured to detect that a device is connected to a hardware interface of the device diagnosis station. For example, a user may connect the device to the hardware interface using a connector cable (e.g., a serial interface cable or USB cable) or by directly inserting the device into the hardware interface (e.g., a PCI slot), and the device diagnosis station may be configured to detect that the hardware interface is being occupied by the device. In one example, a user may connect a device to a device diagnosis station via a wireless connection, such as WIFI, BLUETOOTH, Zigbee, Z-Wave, NFC (Near Field Communication), cellular, and the like.

After detecting the device, the device diagnosis station may be configured to obtain identifying information for the device. For example, the device may be queried for device information, such as device type, model, serial number, etc. and the device information may be used to retrieve a device profile for the device. As in block 404, in the case that device information cannot be obtained from a device (e.g., the device is unable to boot up), then as in block 406, a user may be requested to provide identifying information for the device. For example, a user may be requested to provide device information, such as a device type, model, or serial number. A user may input the requested device information into the device diagnosis station, and the device diagnosis station may use the device information to retrieve a device profile for the device. In one example, a user may be presented with a listing of devices for which the device diagnosis station may be configured to handle, and the user may select the device from the listing. In another example, the device diagnosis station may be configured to detect a hardware interface used by a device, and a listing of devices that use the hardware interface may be presented to a user, who may then select the device from the listing.

As in block 408, testing instructions used to test the operating state of the device may be identified and executed. For example, the device profile for the device may link to testing instructions for the device, or the device profile may include the testing instructions for the device. The testing instructions may be specific to the device. For example, testing instructions may include one or more scripts and/or applications that have been developed to test the operating state of a particular device type, device model, and/or software build. As an illustration, testing instructions may be developed for a computing device that has a particular hardware architecture and operating system, and the testing instructions may be linked to a device profile for the device. Having identified the testing instructions for the device, the testing instructions may be executed. The testing instructions may test hardware functionality and software functionality of the device. For example, the testing instructions may test physical device connections (e.g., power connections, circuit connections, bus connectors, physical network ports, etc.), software interfaces (e.g., driver interfaces, application programming interfaces (APIs), etc.), firmware, operating systems, hardware, and/or may instruct the device to perform a defined function (e.g., boot up, execute computing functions, networking functions, storage functions, etc.).

As in block 410, in the case that execution of the testing instructions results in no error state being detected, then a determination may be made that the device is functioning correctly, as in block 412, and a notification may be provided to a user that testing of the device indicates that the device is operating normally. In the case that execution of the testing instructions detects an error state (e.g., the device is experiencing a hardware failure and/or a software failure), then a notification may be provided to a user describing the error state of the device. For example, a user may be provided with details regarding any hardware and/or software failures.

In detecting an error state, as in block 414, a determination whether to attempt a recovery of the device may be made. For example, if the error state is associated with a hardware failure (e.g., the device is unable to be powered on or some sub-system is failing), then a determination may be made that the device is unrecoverable and a RMA may be issued for the device and user data may be removed from the device, as in block 420. However, if the error state is associated with a software failure (e.g., the device fails to boot up, or the device fails to perform a configured action), or a configurable hardware error, then a determination may be made that reinstalling the software on the device or reconfiguring the hardware may restore the device to a functioning state.

In one example, the device may be forced into a recovery mode, allowing the device to be analyzed and restored to a functioning state. For example, the device diagnosis station may be configured with instructions that force a device into recovery mode, or the device diagnosis station may provide a user with instructions to force a device into recovery mode (e.g., hold device power button for 10 seconds). In the case that device hardware can be reconfigured, the device diagnosis station may provide a user with instructions for reconfiguring the hardware (e.g., reconfiguring a jumper used to close, open, or bypass part of an electronic circuit in a device).

As in block 416, recovery instructions may be identified for the device and the recovery instructions may be executed. The recovery instructions may cause program code (e.g., executable program code, scripts, etc.) to be restored on the device. As an example, the recovery instructions may be one or more scripts or applications that when executed format non-volatile memory and install software on the non-volatile memory included in the device. The recovery instructions may be specific to the device. That is, recovery instructions may be developed for each device type and model. Recovery instructions for a device may be included in a device profile for the device, or the device profile may be linked to the recovery instructions.

After executing the recovery instructions, a determination whether recovery of the device was successful may be made, as in block 418. For example, the testing instructions for the device may be executed, and if no error state is detected, then a determination may be made that the device is functioning correctly. However, if an error state is detected, then a determination may be made that the device is unrecoverable and a RMA may be issued for the device and user data may be removed from the device.

Figure 5:
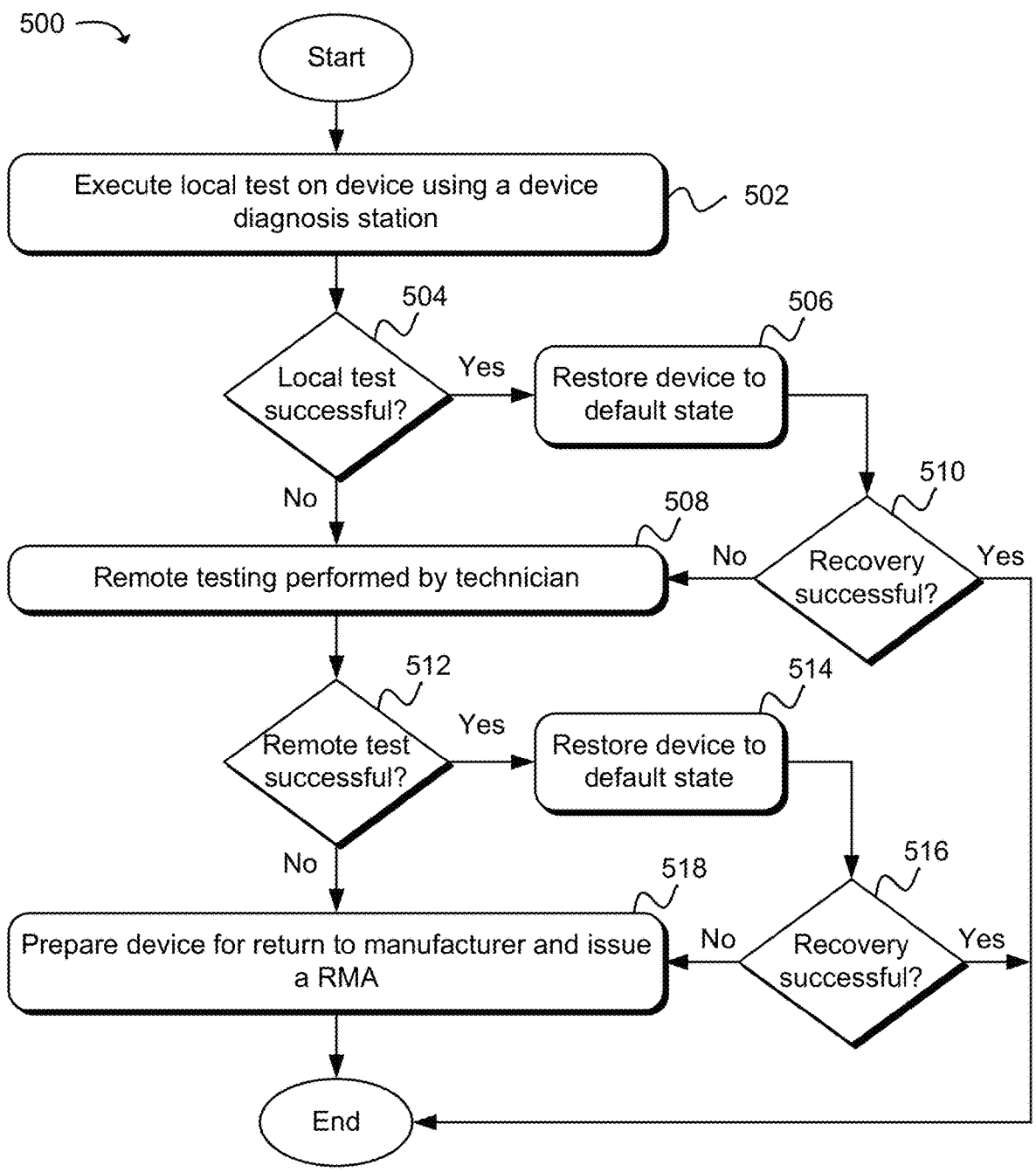
FIG. 5 is a flow diagram that illustrates an example method for determining an issue with a device locally using a device diagnosis station and escalating the issue to a remote technician when the issue cannot be resolved locally.

FIG. 5 is a flow diagram illustrating an example method 500 for determining an issue with a device locally using a device diagnosis station and escalating the issue to a remote technician when the issue cannot be resolved locally. Starting in block 502, a device diagnosis station may be used to execute a local test on a device to determine a functional state of the device. For example, as described earlier, testing instructions linked to a device profile may be executed by the device diagnosis station. The testing instructions may test device hardware and software in order to identify one or more issues that may cause the device to function improperly.

As in block 504, if the local test is successful in identifying an issue with the device, then as in block 506, an attempt to resolve the issue may be performed by restoring the device to a default or factory state), or restoring the device to a prior state, such as a restore point. For example, as described earlier, recovery instructions linked to a device profile for the device may be executed to reset the device to a default or factory state). As in block 510, if the recovery is successful in resetting the device to a default state, then a user of the device diagnosis station may be provided with a notification indicating that the device has been restored.

In the event that either a local test of the device (as in block 504) or a recovery of the device (as in block 510) is unsuccessful, then the issue may be escalated to a remote technician, who as in block 508 may perform remote testing of the device. In determining that a local test or device recovery has failed to resolve an issue with a device, the device diagnosis station may be configured to establish a network connection with a remote technician that provides the technician with full or limited access to the device. The technician may remotely run tests on the device, inspect device logs, collect operational state information, and use other debugging tools in order to attempt to identify an issue that may be causing the device to function improperly.

As in block 512, if the remote technician is successful in identifying an issue with the device, then as in block 514, the remote technician may attempt to resolve the issue with the device by restoring the device to a default or factory state using the recovery instructions described above. In another example, the remote technician may restore the device to a prior state using a restore point for the device. As in block 516, if the recovery of the device is successful in resetting the device to a default state, then a user of the device diagnosis station may be provided with a notification indicating that the device has been restored. However, if the remote technician is unable to identify an issue with the device, or the technician determines that the device is unrecoverable, then as in block 518, the device may be prepared for return to the manufacturer (e.g., device memory may be formatted to remove user information) and a RMA may be issued for the device. Likewise, if an attempt to restore the device to a default state fails, then the device may be prepared for return to the manufacturer (e.g., user data may be removed from the device) and a RMA may be issued for the device.

Figure 6:
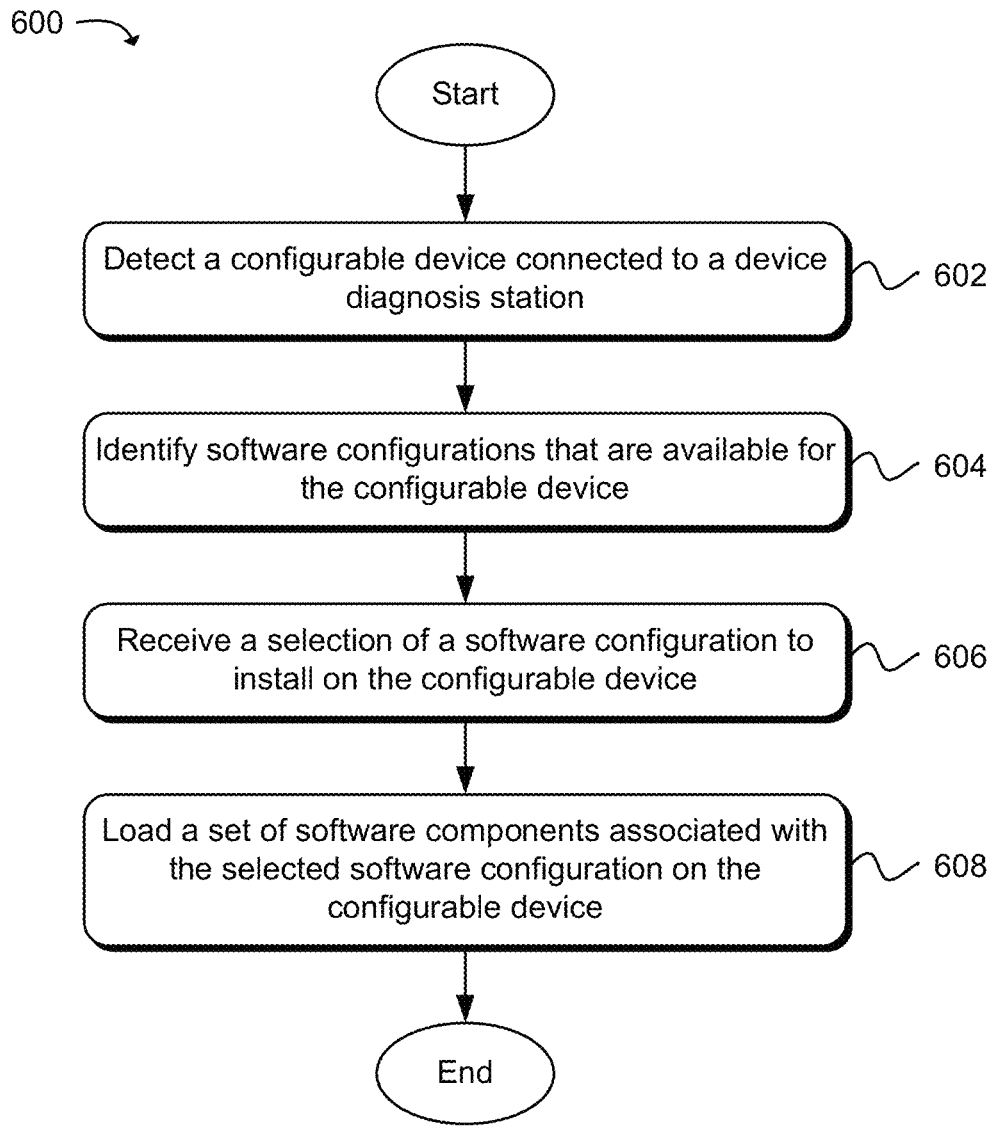
FIG. 6 is a flow diagram illustrating an example method for using a device diagnosis station to configure a device to perform a defined data center function.

FIG. 6 is a flow diagram that illustrates an example method 600 for using a device diagnosis station to configure a device to perform a function. A configurable device may include a system on a chip (SOC) device that includes a processor and non-volatile memory that can be configured using a set of software components to perform a data center function, such as computing, networking, storage, etc. As an example, a set of software components that includes components for a storage service may be installed on a SOC device and the SOC device can be installed on a data center server to provide data center customers with the storage service.

A user may connect a configurable device to a hardware interface, such as a PCI slot, included in the device diagnosis station. As in block 602, the device diagnosis station may detect the configurable device connected to the hardware interface and obtain device information from the configurable device. For example, the device diagnosis station may query the device for a device type, version, and/or model. Using the device information, the device diagnosis station may identify one or more software configurations that may be available to install on the configurable device, as in block 604.

In one example, defined data center resources, such as computing, networking, and storage resources, which the configurable device may be capable of providing may be identified, and a listing of these defined data center resources may be provided to a user of the device diagnosis station. For example, the device diagnosis station may be configured to identify a selection of software component sets that may be compatible with the configurable device and may be available to install on the configurable device to cause the configurable device to perform as a defined data center resource. For example, available software configurations may be output to a display and the user may select a software configuration to install on the device.

As in block 606, a selection of a software configuration selected by a user may be received by the device diagnosis station, and as in block 608, a set of software components associated with the selected software configuration may be loaded on the device (e.g., loaded onto non-volatile memory of the configurable device). Thereafter, the device diagnosis station may be used to test the configurable device to ensure that the device is able to perform the function associated with the software configuration selected by the user.

Figure 7:
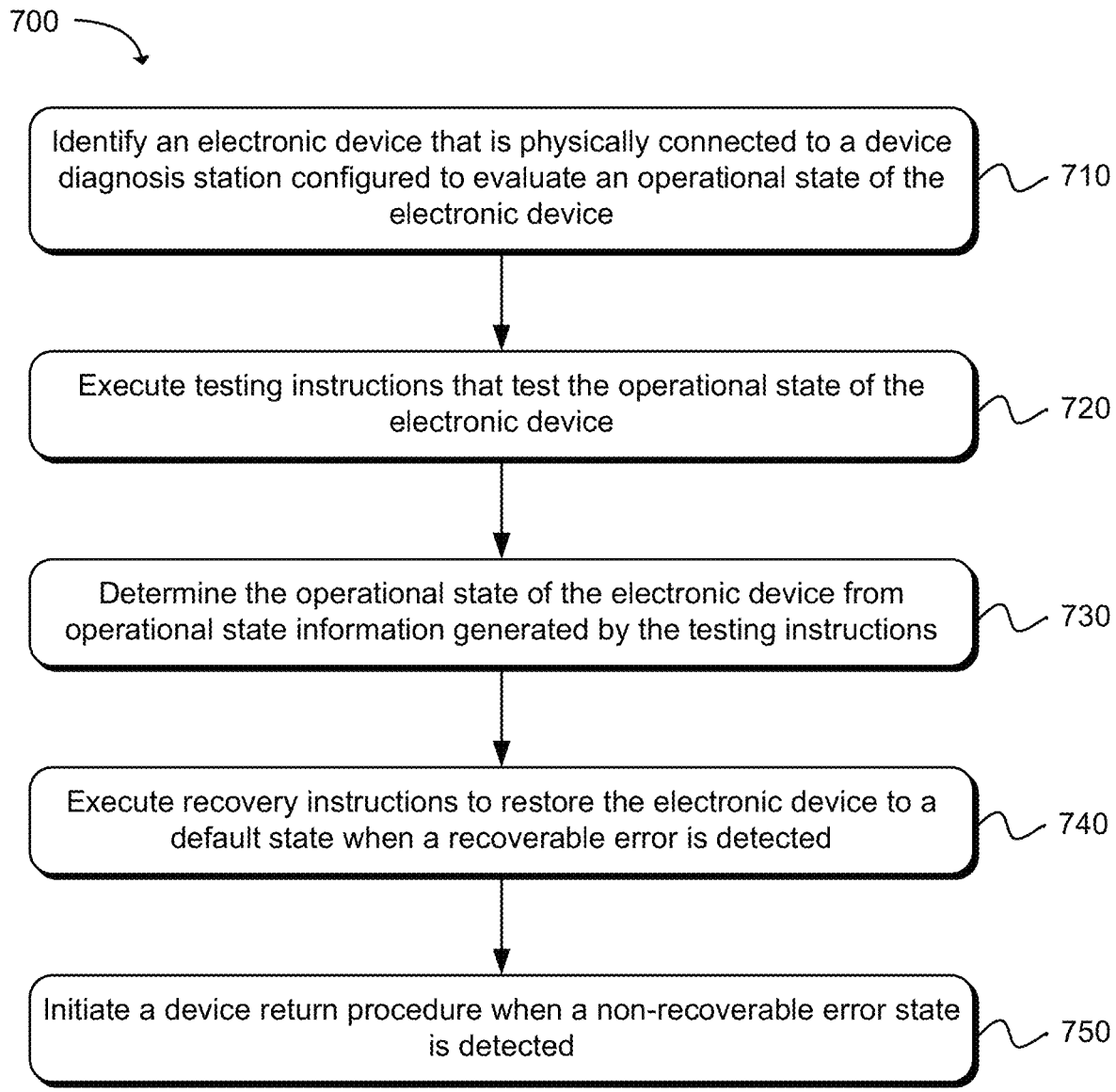
FIG. 7 is a flow diagram that illustrates an example method for evaluating an operational state of an electronic device using a device diagnosis station and performing an action based in part on the operational state of the electronic device.

FIG. 7 is a flow diagram illustrating an example method 700 for evaluating an operational state of an electronic device using a device diagnosis station and performing an action based in part on the operational state of the electronic device. As in block 710, the device diagnosis station may be configured to identify an electronic device that is physically connected to the device diagnosis station. In one example, the device diagnosis station may detect that the electronic device is physically connected to a device connector included in the device diagnosis station. Thereafter, the device diagnosis station may obtain identifying information stored on the electronic device, wherein the identifying information may include at least one of: a model number, part number, serial number, device name, device manufacturer, build number, or version number. The device diagnostic station may identify a device profile for the electronic device that corresponds to the identifying information, and identify testing instructions and recovery instructions that may be linked to the device profile.

In one example, a physical device interface used to connect an electronic device to the device diagnostic station may be identified and the electronic device may be identified based in part on the physical device interface. Also, in one example, a hardware interface design or form factor used by an electronic device may be identified by detecting a portion of connectors included in the electronic device's hardware interface that are mated to the device connector included in the device diagnostic station, and correlating the portion of connectors that are occupied to a hardware interface design or form factor. As an illustration, a device connector may include multiple PCI interface form factors, such as a PCI Express interface, a Mini PCI interface, and/or a specialized PCI interface. A user may connect a device to the device connector and the PCI interface form factor used by the device may be detected according to which connectors of the device connector are occupied. The identity of the electronic device's hardware interface may then be used in part by the device diagnosis station to identify the electronic device.

As in block 720, testing instructions may be executed by the device diagnosis station that test the operational state of the electronic device, where the testing instructions may test the functionality of the electronic device and collect operational state information for the electronic device. As in block 730, the operational state of the electronic device may be determined from operational state information generated by the testing instructions. For example, the operational state information may be analyzed by the device diagnosis station to determine the operational state of the electronic device. In one example, device diagnosis station may send the operational state information to a remote diagnosis service for collection and analysis of the operational state information and the remote diagnosis service may provide an indication of the operational state of the electronic device to the device diagnostic station. Also, in one example, a network connection may be established with the remote diagnosis service to allow a technician to inspect the electronic device via the network connection. For example, the technician may analyze the operational state information collected for the electronic device and provide an indication of the operational state of the electronic device to a user of the device diagnostic station. In one example, a technician may be a virtual technician configured to interact with a user of the device diagnosis station to diagnose an issue with an electronic device.

In the case that analysis of the operation state information indicates that a recoverable error has caused the electronic device to malfunction, the device diagnostic station may execute recovery instructions to restore the electronic device to a default or functioning state, as in block 740. For example, the recovery instructions may cause program code on the electronic device to be restored. As an illustration, analysis of the operation state information may indicate that a software error is causing the device malfunction and the recovery instructions may install a new copy of software onto the electronic device. In another example, the recovery instructions may attempt to restore an electronic device to a default or functioning state by performing a hard restart of the electronic device.

In the case that a non-recoverable error state is detected, the device diagnostic station may initiate a device return procedure to return the electronic device to a returns administrator, as in block 750. The returns administrator may be a device manufacturer, distributor, retailer, device repair facility, or other entity. As an example, execution of the testing instructions may indicate that the electronic device is incapable of being restored to a default or functioning state (e.g., due to a hardware failure), or execution of the recovery instructions may have failed to restore the electronic device to a functioning state, and as such, the device may be placed in a default state, which may include removing user data from the device, and a device return procedure may be initiated. In one example, a device return procedure may include issuing a RMA to a user of the device diagnostic station that allows the user to return the electronic device to a manufacturer, distributor, or retailer. In another example, a device return procedure may include opening a device return file, ticket, or matter with a return facility, allowing a device to be tracked and putting the return facility on notice to expect the device; and a user may be provided with information used to return the device to the return facility.

Figure 8:
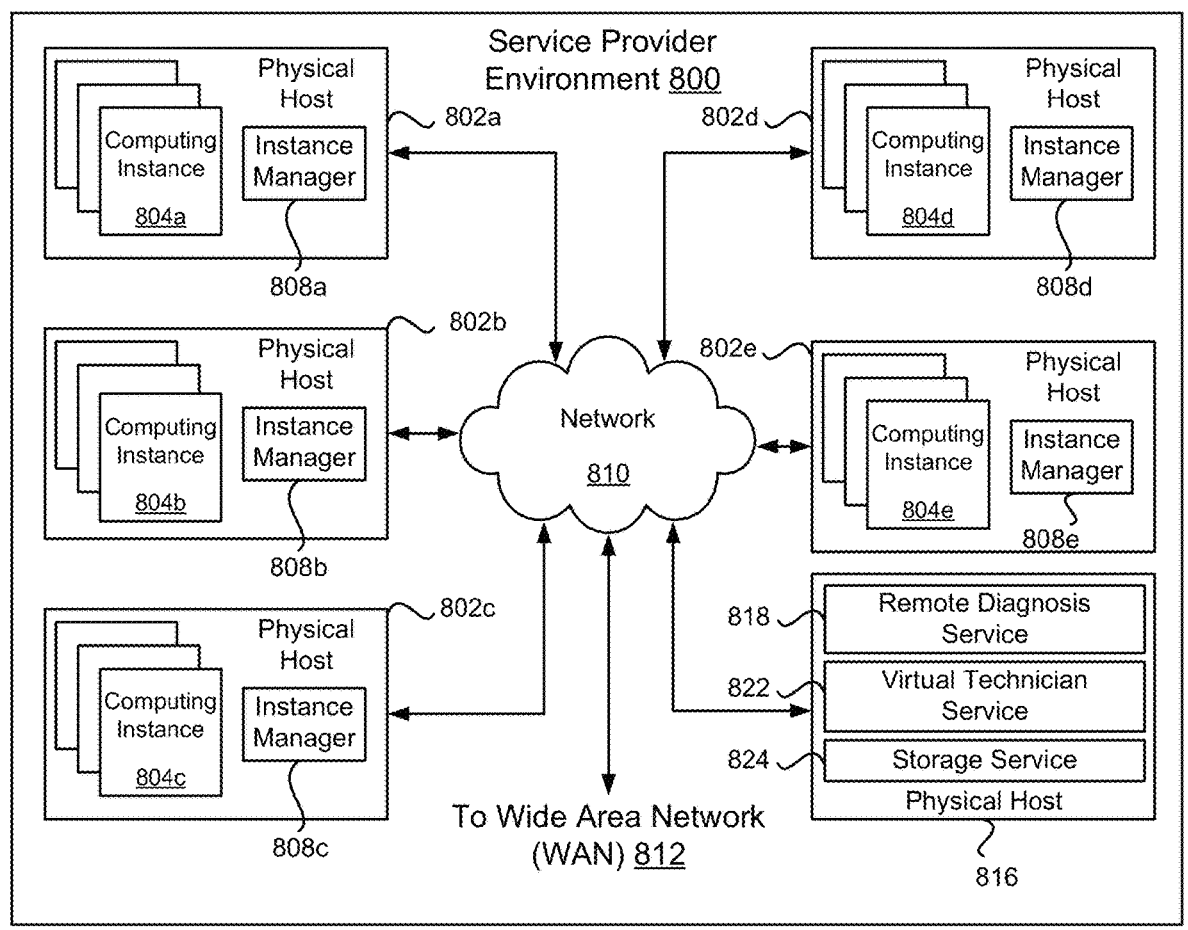
FIG. 8 is a block diagram that illustrates an example service provider environment.

FIG. 8 is a block diagram illustrating an example service provider environment 800 that may be used to execute and manage a number of computing instances 804a-d. In particular, the service provider environment 800 depicted illustrates one environment that may be used to host a remote diagnosis service 818, virtual technician service 822, and/or storage service 824 described in association with FIG. 2. The service provider environment 800 may be one type of environment that includes various virtualized service resources that may be used, for instance, to host computing instances 804a-d.

The service provider environment 800 may be capable of delivery of computing, storage and networking capacity as a software service to a community of end recipients. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), Platform as a Service ("PaaS"), and/or Software as a Service ("SaaS"). Other models may be provided. For the IaaS model, the service provider environment 800 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 800. End customers may access the service provider environment 800 using networked client devices, such as desktop computers, laptops, tablets, smartphones, etc. running web browsers or other lightweight client applications, for example. Those familiar with the art will recognize that the service provider environment 800 may be described as a "cloud" environment.

The particularly illustrated service provider environment 800 may include a plurality of server computers 802a-d. While four server computers are shown, any number may be used, and large data centers may include thousands of server computers. The service provider environment 800 may provide computing resources for executing computing instances 804a-d. Computing instances 804a-d may, for example, be virtual machines. A virtual machine may be an instance of a software implementation of a machine (i.e. a computer) that executes applications like a physical machine. In the example of a virtual machine, each of the server computers 802a-d may be configured to execute an instance manager 808a-d capable of executing the instances. The instance manager 808a-d may be a hypervisor, virtual machine monitor (VMM), or another type of program configured to enable the execution of multiple computing instances 804*a-d* on a single server. Additionally, each of the computing instances 804*a-d* may be configured to execute one or more applications.

A network 810 may be utilized to interconnect the service provider environment 800 and the server computers 802*a-d*, 816. The network 810 may be a local area network (LAN) and may be connected to a Wide Area Network (WAN) 812 or the Internet, so that end customers may access the service provider environment 800. The network topology illustrated in FIG. 8 has been simplified, many more networks and networking devices may be utilized to interconnect the various computing systems disclosed herein.

Figure 9:
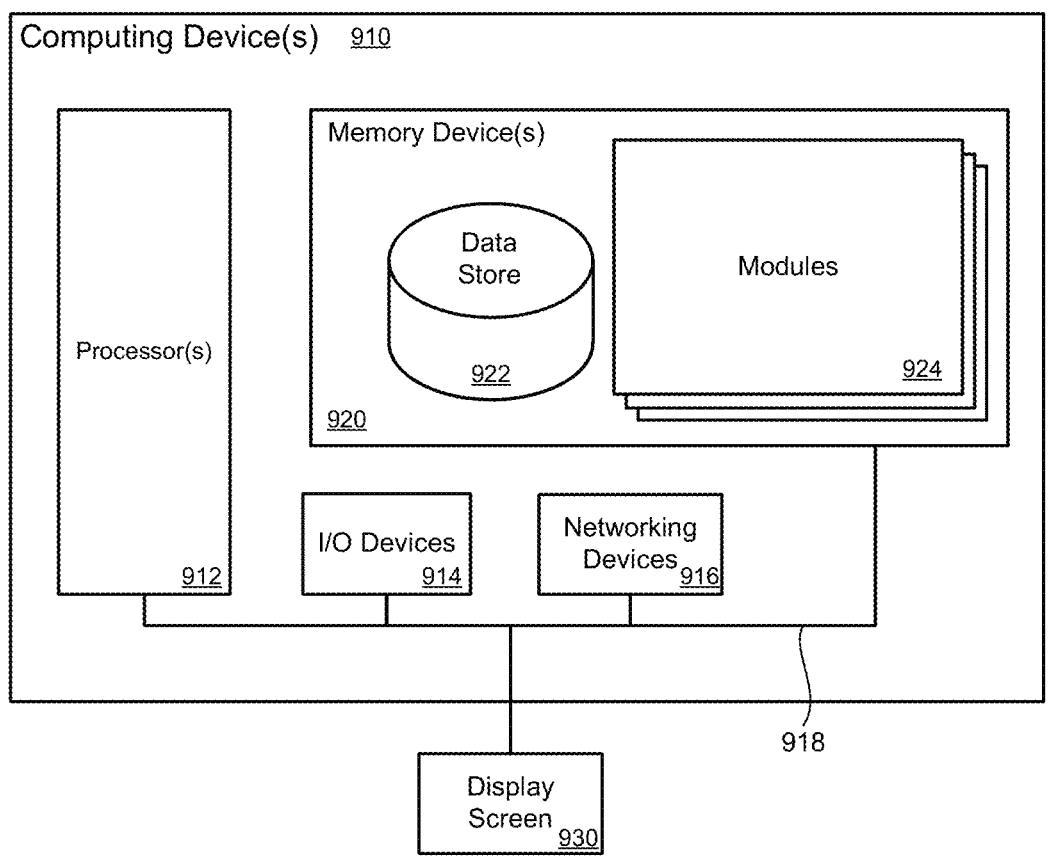
FIG. 9 is block diagram illustrating an example of a computing device that may be used to provide the services of a device diagnosis station.

FIG. 9 illustrates a computing device 910 on which modules of this technology may execute. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may include a device identity module, device testing module, device configuration module, remote diagnosis module, device information module, RMA module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules described in this description may be implemented in the form of software using high-level programming languages that are compiled, interpreted or executed using a hybrid of the methods.

The computing device may also have access to I/O (input/output) devices 914 that are usable by the computing devices. An example of an I/O device is a display screen 930 that is available to display output from the computing device 910. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting, or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A device diagnosis station, comprising:
a device connector;
at least one processor; and
a memory device including instructions that, when executed by the at least one processor, cause the device diagnosis station to:
obtain identifying information for a configurable data center device that is communicatively coupled to the device connector, wherein the configurable data center device is configurable to operate as one of a plurality of defined data center components;
identify a device profile for the configurable data center device that corresponds to the identifying information;
execute testing instructions that are linked to the device profile, wherein the testing instructions test physical device connections, device hardware, and device software interfaces to determine whether the configurable data center device is able to operate as one of the plurality of defined data center components;
determine that the configurable data center device is in an error state;
identify recovery instructions that are linked to the device profile, wherein the recovery instructions cause program code on the configurable data center device to be restored to default program code that configures the configurable data center device to operate as one of the plurality of defined data center components;
execute the recovery instructions to attempt to restore the configurable data center device to a functioning state; and
issue a return merchandise authorization (RMA) when the recovery instructions fail to restore the configurable data center device to the functioning state.

2. The device diagnosis station as in claim 1, wherein the device connector includes an end portion that contains connectors for a plurality of physical device interfaces, wherein connecting the device connector to the configurable data center device mates a corresponding one of the connectors to a physical device interface of the configurable data center device.

3. The device diagnosis station as in claim 2, wherein the memory device includes instructions that, when executed by the at least one processor, cause the device diagnosis station to further:
identify a hardware interface design of the configurable data center device based on the one of the connectors that is mated to the physical device interface of the configurable data center device; and
identify the configurable data center device based on information from the hardware interface design.

4. The device diagnosis station as in claim 1, wherein the memory device includes instructions that, when executed by the at least one processor, cause the device diagnosis station to further:
establish a network connection with a remote diagnosis service to allow remote inspection of the configurable data center device via the network connection.

5. The device diagnosis station as in claim 1, wherein the memory device includes instructions that, when executed by the at least one processor, cause the device diagnosis station to further:
remove user data stored on the configurable data center device prior to issuing the RMA for the configurable data center device.

6. A computer implemented method, comprising:
identifying a configurable data center device physically connected to a device diagnosis station, wherein the configurable data center device is configurable to operate as one of a plurality of defined data center components;
executing testing instructions that test an operational state of the configurable data center device to operate as one of the plurality of defined data center components;
determining the operational state of the configurable data center device from operational state information generated by the testing instructions;
executing recovery instructions to configure the configurable data center device to operate as one of the defined data center components when a recoverable error is detected; and
initiate a device return procedure when a non-recoverable error state is detected.

7. The method as in claim 6, wherein identifying the configurable data center device comprises:
detecting that the configurable data center device is physically connected to a device connector included in the device diagnosis station;

identifying a physical device interface included in the configurable data center device based on connectors in the device connector that are mated to the physical device interface; and identifying the configurable data center device based on the physical device interface.

8. The method as in claim 6, wherein identifying the configurable data center device comprises:

detecting that the configurable data center device is physically connected to a device connector included in the device diagnosis station;

obtaining identifying information stored on the configurable data center device, wherein the identifying information includes a model number, a part number, a serial number, a device name, a device manufacturer, a build number, or a version number;

identifying a device profile for the configurable data center device that corresponds to the identifying information; and identifying the testing instructions and the recovery instructions linked to the device profile.

9. The method as in claim 8, further comprising:

obtaining device documentation that is linked to the device profile, wherein the device documentation includes user manuals and device testing documentation for the configurable data center device; and providing the device profile and the device documentation for the configurable data center device to a user via an output device included in the device diagnosis station.

10. The method as in claim 6, further comprising:

establishing a network connection between the device diagnosis station and a remote diagnosis service to allow a technician to analyze the operational state information of the configurable data center device; and receiving an indication of the operational state of the configurable data center device from the remote diagnosis service.

11. The method as in claim 10, wherein the technician is a virtual technician that is configured to provide instructions to a user of the device diagnosis station to diagnose the configurable data center device.

12. The method as in claim 6, further comprising sending device data obtained from the configurable data center device to a remote technician environment allowing a technician to analyze the device data and diagnose an issue with the configurable data center device.

13. The method as in claim 6, further comprising obtaining device data from the configurable data center device and analyzing the device data at the device diagnosis station using a machine learning model configured to diagnose an issue with the configurable data center device.

14. The method as in claim 6, wherein the configurable data center device is a system on a chip (SOC) device that is configured to be coupled with a plurality of SOC devices to operate as one of the defined data center components.

15. The method as in claim 14, wherein the SOC device is reconfigurable to operate as one of the plurality of defined data center components via a set of software components contained in non-volatile memory of the SOC device.

16. The method as in claim 15, wherein executing the recovery instructions comprises:

identifying the set of software components that, when executed, configure the configurable data center device to operate as one of the plurality of defined data center components;

obtaining the set of software components from a service provider environment; and loading the set of software components in the non-volatile memory of the SOC device.

17. The method as in claim 15, further comprising:

sending a plurality of sets of software components associated with the plurality of defined data center components available to be loaded onto the SOC device to a user; and receiving a user selection of a set of software components included in the plurality of sets of software components to load on the SOC device, wherein the set of software components selected by the user, when executed, configures the configurable data center device to operate as one of the plurality of defined data center components.

18. A non-transitory machine readable storage medium including instructions embodied thereon, wherein the instructions, when executed by at least one processor, cause the at least one processor to:

receive, at a diagnosis service, identifying information for a configurable data center device that is physically connected to a device diagnosis station, wherein the device diagnosis station is in network communication with the diagnosis service, and the configurable data center device is configurable to operate as one of a plurality of defined data center components;

identify a device profile for the configurable data center device based on the identifying information;

initiate testing instructions associated with the device profile to be executed, wherein the testing instructions test functionality of the configurable data center device to operate as one of the plurality of defined data center components and collect operational state information for the configurable data center device;

determine that the configurable data center device is in an error state based on the operational state information;

identify recovery instructions associated with the device profile, wherein the recovery instructions load program code on the configurable data center device that, when executed, configures the configurable data center device to operate as one of the plurality of defined data center components; and initiate a return merchandise authorization (RMA) when the recovery instructions fail to restore the configurable data center device to a functioning state.

19. The non-transitory machine readable storage medium in claim 18, further comprising instructions that when executed by the at least one processor, cause the at least one processor to:

identify the plurality of defined data center components for which the configurable data center device is configurable to provide, wherein the plurality of defined data center components include: computing components, networking components, and storage components; and provide a listing of the plurality of defined data center components to a user of the device diagnosis station.

20. The non-transitory machine readable storage medium in claim 19, further comprising instructions that when executed by the at least one processor, cause the at least one processor to:

receive an instruction to configure the configurable data center device to operate as one of the plurality of defined data center components;

identify a set of software components, that when executed by the configurable data center device, configure the configurable data center device to operate as one of the defined data center components; and install the set of software components on the configurable data center device.

21. The non-transitory machine readable storage medium in claim 18, further comprising instructions that when executed by the at least one processor, cause the at least one processor to:
- determine that the configurable data center device is unrecoverable;
- remove user data from the configurable data center device; and
- initiate a device return procedure to return the configurable data center device to a device recipient.

* * * * *